United States Patent [19]

Gläser

[11] Patent Number: 4,510,190
[45] Date of Patent: Apr. 9, 1985

[54] TRANSPARENT, HEAT-INSULATING COATING FOR A TRANSPARENT SUBSTRATE

[75] Inventor: Hans J. Gläser, Beverungen, Fed. Rep. of Germany

[73] Assignee: Interpane Entwicklungs-und Beratungsgesellschaft mgH & Co. K.G., Fed. Rep. of Germany

[21] Appl. No.: 478,258

[22] Filed: Mar. 24, 1983

[30] Foreign Application Priority Data

Mar. 30, 1982 [DE] Fed. Rep. of Germany ....... 3211753

[51] Int. Cl.$^3$ .......................... E06B 3/24; B32B 15/00
[52] U.S. Cl. ..................................... 428/34; 428/432; 428/469; 427/160; 427/164; 427/404; 427/419.2; 204/192 P; 204/192 D
[58] Field of Search ............ 427/164, 162, 165, 160, 427/404, 419.2; 428/34, 216, 432, 469; 52/171, 202; 204/192 R, 192 P, 192 D; 350/1.7, 164

[56] References Cited

U.S. PATENT DOCUMENTS

| 4,215,168 | 7/1980 | Yonemura et al. | 428/215 |
| 4,320,169 | 3/1982 | Yatabe et al. | 428/333 |
| 4,414,254 | 11/1983 | Iwata et al. | 428/463 |

FOREIGN PATENT DOCUMENTS 24925 3/1981 European Pat. Off. .

OTHER PUBLICATIONS

"Improved Insulating Glass with Low Emissivity Coatings Based on Gold, Silver, or Copper Films Embedded in Interference Layers", H.-J. Glaser, *Glass Technology*, vol. 21, No. 5, Oct. 1980, pp. 254-261.

Primary Examiner—Norman Morgenstern
Assistant Examiner—Ken Jaconetty
Attorney, Agent, or Firm—Wood, Dalton, Phillips, Mason & Rowe

[57] ABSTRACT

A transparent, heat-insulating coating, neutrally acting in transparency and external appearance, for transparent substrates, more particularly for insulating glass panes, is disclosed.

The coating is formed from a bismuth oxide-silver-bismuth oxide multilayer system in which a more electronegative substance, i.e. a substance with a higher normal potential, is added to the bismuth oxide layers to avoid blackening under UV radiation. If manganese is used as the electronegative substance, its oxidation to higher valency states can be prevented by the addition of trivalent substances. The layers may be applied in a conventional way by diode-cathode atomization.

16 Claims, 3 Drawing Figures

TRANSPARENT, HEAT-INSULATING COATING FOR A TRANSPARENT SUBSTRATE

TECHNICAL FIELD OF THE INVENTION

The invention relates to a transparent, heat-insulating coating for a transparent substrate, to a method for producing it, and to a sun and heat-protective insulating pane provided with such a coating.

BRIEF DESCRIPTION OF THE PRIOR ART

Thin multilayer coatings for transparent substrates with the layer sequence, bismuth oxide-silver-bismuth oxide, are known. With suitable layer thicknesses, this bismuth oxide-silver-bismuth oxide multilayer system forms an excellent, heat-insulating coating on transparent substrates, such as glass and plastics materials (cf. the journal "Glass Technology", Vol. 21, No. 5 (October 1980), page 254 and also the German patent application Ser. No. P 28 54 213). The bismuth oxide layers act in the multilayer system as reflection-reducing layers for the silver layer, i.e. they increase considerably the transmission of the silver layer particularly in the visible region. Also, these layers act as protective layer for the silver layer. In addition to its great heat-insulation effect (low emission capacity) the coating is also distinguished by a high transparency to sun rays and, furthermore, it may be applied economically with high colour uniformity by conventional diode-cathode atomization.

For the production of insulating glass panes it is customary to-day for the required heat-insulating coatings to be applied to glass panes of large area which, after coating, are cut to the required size. Coatings with bismuth oxide are very advantageous for the manufacture of heat-insulating glass because they can be removed from the edges of the pane by means of a simple flame reduction process, so that it is easy to apply to the edge of the pane customary adhesives intended for adhesion to glass surfaces. After the heat insulating coating has been removed from the edge of the pane, the panes, which are coated over their remaining surface, can be made into insulating glass with the approximate finishing machines in the same way as uncoated glass panes.

However, it is known that the bismuth oxide-silver-bismuth oxide multilayer system is not resistant to the sun's ultraviolet rays (UV radiation). UV radiation causes the layer to blacken, i.e. leads to a loss of transparency to the sun's rays and to a reduction of the heat-insulating effect. This blackening is probably due to the fact that the silver is activated by ultraviolet rays and diffuses into the bismuth oxide where it is then deposited as silver particles.

To overcome this problem it has been proposed that an intermediate layer, preferably approximately 4 nm thick, of lead oxide, antimony oxide or tellurium oxide should be applied between each of the silver and bismuth oxide layers (see German patent application Ser. No. P 31 30 857.0). The foregoing is not prior art to the present application, because the German patent application was first published on Feb. 17, 1983, about 10½ months after the claimed Convention priority date of the present disclosure. Although it is possible to apply such intermediate layers by means of conventional diode-cathode atomization, their application is relatively expensive because of the additional coating costs.

It is an object of the invention to provide a heat-insulating coating which is based on the bismuth oxide-silver-bismuth oxide multilayer system, but which is not subject to a gradually progressive blackening under incident light radiation and with which the minimum number of layers can be economically applied by conventional diode-cathode atomization.

SUMMARY OF THE INVENTION

According to the present invention there is provided, in a transparent, heat-insulating coating, for a transparent substrate, the heat-insulating coating consisting essentially of a bismuth oxide-silver-bismuth oxide multilayer system, the improvement which comprises mixing with the bismuth oxide layers at least one substance which is a more electronegative substance.

Preferably, the more electronegative substance is chosen to be more electronegative than bismuth, i.e. is a substance having higher normal electrode potential than bismuth.

Preferably, the more electronegative substance is chosen from the group consisting of the elements indium, iron, nickel, zinc, manganese, magnesium, titanium, cadmium and zircon. The elements are advantageously used in a proportion ranging from 0.2 to 10% by weight. An addition of about 0.6% by weight of manganese has proved to be particularly advantageous. This not only allows the blackening to be avoided, but also allows the coating's susceptibility to corrosion, for example from finger imprints, to be substantially decreased.

A further advantage of this composition is that it can be reactively atomized by means of conventional diode-cathode atomization, the atomization ratio scarcely differing from that of pure bismuth oxide. The whole bismuth oxide-silver-bismuth oxide multilayer system can therefore be deposited economically by means of conventional cathode atomization.

It is also advantageous if a trivalent metal, for example iron, chromium, lanthanum, cerium or indium, is added to the bismuth oxide/manganese composition so that a spinel configuration is formed between the manganese and the trivalent metal. This avoids any release of oxygen if there is hyperoxidation of the bismuth oxide layer, for example too high an oxygen partial pressure during the atomization process, and thus avoids the layer blackening.

Laboratory tests showed that the blackening of the bismuth oxide-silver-bismuth oxide multilayer system under UV radiation is caused by oxidation of the silver. It has been shown in particular that if a blackened layer is annealed for a short time at 250° C., the blackening disappears. It is known that silver oxide is not stable above 250° C.

The addition according to the invention of a more electronegative substance, such as manganese, enables the splitting off of oxygen from the bismuth oxide and the oxidation of the silver under UV radiation to be prevented. However, when too much oxygen is available the manganese reaches high valency states which again easily split off oxygen, for example under UV radiation. As is known per se, however, these high valency states can be prevented by suitable spinel configurations.

For the production of the heat-insulating coating according to the invention, a bismuth oxide layer (with the additive) is firstly applied directly onto the transparent substrate, for example a glass pane or a plastic sheet. A silver layer is laid on top of this and is covered in turn by a bismuth oxide layer (with the additive) to form the topmost layer. Prior to this, a metal, for example manganese, which is more electronegative than bismuth or than bismuth oxide is added to the bismuth oxide which is to form the first and final layers and if necessary trivalent metals, for example iron, chromium, lanthanum, cerium or indium are also added to stabilize low valency states of the manganese. Bismuth oxide alloys or compositions of this kind enable blackening under UV radiation to be effectively avoided, the atomization rate during conventional diode-cathode atomization being roughly the same as in the case of pure bismuth oxide. It has also proved additionally advantageous that this type of multilayer system is substantially less prone to corrosion than a multilayer system with pure bismuth oxide. The desired advantageous edge removal by flame reduction is, however, also ensured as in the multilayer system with pure bismuth oxide.

In addition to glass panes, transparent sheets, such as plastic sheets, for example, are also suitable as substrates for the heat-insulating coating according to the invention. Plastics sheets of this kind provided with the heat insulating coating may be arranged in a gap between two glass panes or be stuck onto one insulating glass pane. In both cases the heat insulating coating improves the heat insulation of an insulating glass pane of this kind.

DESCRIPTION OF PREFERRED EMBODIMENTS OF THE INVENTION

Figure 1:
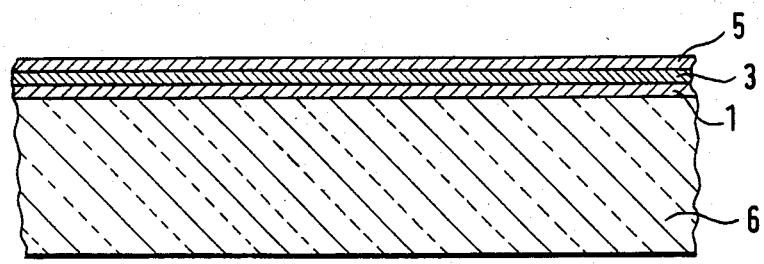
FIG. 1 shows diagramatically a cross section through a glass pane with the heat insulating coating according to the invention

FIG. 1 shows a diagrammatic cross section through a glass pane 6 on which there is applied a supertransparent, heat-insulating coating according to the invention, which is neutral in transparency and external appearance. Directly on top of the transparent substrate formed by the glass pane 6 there is a first layer 1 made of bismuth oxide ($Bi_2O_3$) to which at least one electronegative substance is added in accordance with the invention. This first layer 1 has a thickness of approximately 30 nm. This first layer 1 is followed by a second layer 3 made of silver which has a thickness of approximately 15 nm. Laid on top of this silver layer is a third layer 5, again made of bismuth oxide to which at least one electronegative substance is added in accordance with the invention. This third layer 5 has a thickness of approximately 25 nm.

The represented coating according to the invention showed no blackening even after six weeks of UV radiation. Also, the coating is thermally stable i.e. after annealing at 100° C. for six weeks no changes could be detected. The multilayer system is less prone to corrosion than one with pure bismuth oxide, but it can still be easily removed from the edges of the pane by flame reduction so that a glass pane 6 provided with the heat insulating coating in accordance with the invention is easy to handle.

The light transmission of the multilayer system in combination with a 4 mm thick float glass pane is approximately 80%. Without the applied heat insulating coating the float glass pane has a light transmission of approximately 90%. The emission capacity of the heat-insulating coating is 0.1, whereas that of glass surfaces is 0.85.

The heat-insulating coating of the invention can be made by successively depositing the individuual layers 1, 3, 5 by conventional diode-cathode atomization, on a transparent substrate of glass or a plastics material, the first and third layers 1 and 5, i.e. the bismuth oxide layers being applied in the same reactive atmosphere, for example in an argon-oxygen mixture, and the second, i.e. the silver layer 3, being applied as appropriate in a different reactive atmosphere, such as an argon atmosphere.

Figure 2:
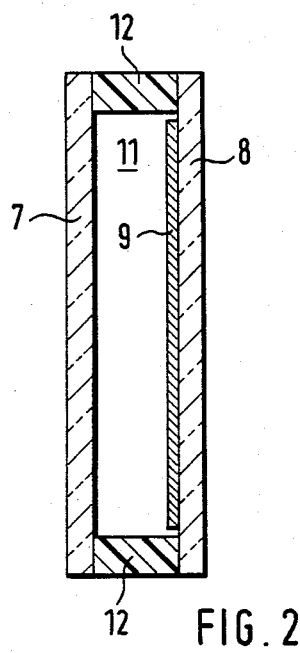
FIG. 2 shows double insulating glazing with one pane bearing the heat insulating coating.

FIG. 2 shows diagrammatically a cross sectopm through an insulating glass panel or double glazing in which a heat-insulating coating 9 according to the invention is applied on one of two panes 7 and 8, facing towards the gap 11 between the panes 7 and 8. The heat-insulating panel consists of two parallel glass panes 7 and 8 which are sealed in an air tight manner at the edge of the panel by gluing (using an adhesive paste 12) or by soldering. A spacer (not shown here) which holds the two panes 7 and 8 the prescribed distance apart, can also be provided. The heat insulating coating 9 reduces the flow of heat between the two panes 7 and 8 by reducing the radiation exchange as a result of the low emission capacity of the coating 9. The pane provided with a coating according to the invention thus has, because of the high transparency to the rays of the sun, a solar collector effect.

Figure 3:
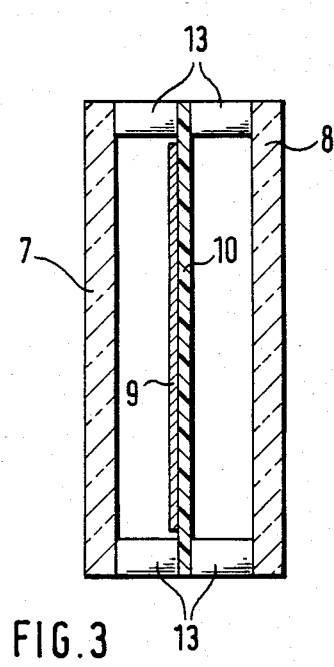
FIG. 3 shows double insulating glazing with a plastic sheet bearing the heat insulating coating and stretched between the panes.

FIG. 3 shows an embodiment in which the heat insulating coating 9 is applied onto a plastic sheet 10. The plastic sheet 10 is stretched between the two panes 7 and 8 and secured in a spacer 13 merely shown diagrammatically.

What is claimed is:

1. A transparent, heat-insulating coating for a transparent substrate, the heat-insulating coating consisting essentially of a bismuth oxide-silver-bismuth oxide multilayer system wherein said bismuth oxide layers incorporate at least one substance which is more electronegative than bismuth or bismuth oxide.

2. A coating according to claim 1, wherein the bismuth oxide layer adjacent to the transparent substrate has a thickness in the range of from about 15 to about 40 nm.

3. A coating according to claim 1, wherein the silver layer has a thickness in the range from about 10 to about 200 nm.

4. A coating according to claim 1, wherein the bismuth oxide layer remote from the transparent substrate has a thickness in the range of from about 10 to about 40 nm.

5. A sun and heat-insulating panel having two parallel transparent panes spaced apart and a heat-insulating coating according to claim 1, wherein the coating is arranged on one of the two panes facing towards the gap between the two parallel panes.

6. A sun and heat-insulating panel having two parallel transparent panes spaced apart and having a coating according to claim 1, wherein the heat-insulating coating is applied to a transparent sheet of a plastics material and the sheet with the heat insulating coating thereon is located between the two parallel panes.

7. A sun and heat-insulating panel according to claim 6, wherein the transparent sheet is stuck onto one of the two panes.

8. A sun and heat-insulating panel according to claim 6, wherein the transparent sheet is located in the space between the two panes.

9. A method of producing a coating according to claim 1, which comprises applying to a transparent substrate a first layer comprising a bismuth oxide and a substance more electronegative than bismuth oxide, applying to the first layer a second layer comprising silver, and applying to the second layer a third layer comprising bismuth oxide and a substance more electronegative than bismuth oxide.

10. A method according to claim 9, wherein each of said layers is applied by diode-cathode atomization.

11. A coating according to claim 1, wherein the more electronegative substance is more electronegative than bismuth.

12. A coating according to claim 1, wherein the more electronegative substance is more electronegative than bismuth oxide.

13. A transparent, heat-insulated coating for a transparent substrate, the heat-insulating coating consisting essentially of a bismuth oxide-silver-bismuth oxide multilayer system wherein said bismuth oxide layers incorporate at least one substance which is more electronegative than bismuth or bismuth oxide, said more electronegative substance being selected from the group consisting of indium, iron, nickel, zinc, manganese, magnesium, titanium, cadmium and zircon.

14. A coating according to claim 13, wherein there is mixed with the bismuth oxide layers from 0.2% to 10% by weight of the more electronegative substance.

15. A coating according to claim 13, wherein there is mixed with the bismuth oxide layers about 0.6% by weight of manganese.

16. A coating according to claim 15, wherein, in addition to the manganese, there is added a trivalent substance selected from groups consisting of iron, lanthanum, chromium, cerium and indium, in a quantity such that a spinel configuration is formed, whereby oxidation of the manganese to higher valency states is prevented.

* * * * *